US006470782B1

United States Patent
Shimotoyodome et al.

(10) Patent No.: US 6,470,782 B1
(45) Date of Patent: Oct. 29, 2002

(54) SCRIBE DEVICE

(75) Inventors: Gyo Shimotoyodome, Tokyo (JP); Isao Sugiura, Tokyo (JP)

(73) Assignees: Beldex Corporation, Tokyo (JP); THK Co., Ltd., Tokyo (JP)

( * ) Notice: Subject to any disclaimer, the term of this patent is extended or adjusted under 35 U.S.C. 154(b) by 0 days.

(21) Appl. No.: 09/064,089

(22) Filed: Apr. 22, 1998

(30) Foreign Application Priority Data

Sep. 25, 1997 (JP) .............................................. 9-278054

(51) Int. Cl.[7] .......................................... C03B 33/027
(52) U.S. Cl. ......................... 83/879; 83/861; 30/164.9; 33/96
(58) Field of Search ......................... 83/879, 880, 881, 83/956, 861, 882; 30/164.9; 33/18.1; 225/96, 2, 96.5; 173/117, 121

(56) References Cited

U.S. PATENT DOCUMENTS

| | | | | |
|---|---|---|---|---|
| 2,467,083 A | * | 4/1949 | Francis, Jr. | ............... 33/18.1 X |
| 3,122,953 A | | 3/1964 | Atkeson | ....................... 83/880 |
| 3,157,329 A | | 11/1964 | De Gorter | .................... 225/93 |
| 3,681,627 A | * | 8/1972 | Murry et al. | ............ 173/117 X |
| 4,420,106 A | | 12/1983 | Hyatt | ........................... 225/2 |
| 4,589,194 A | * | 5/1986 | Roy | .......................... 83/880 X |
| 5,038,654 A | * | 8/1991 | Mackey | ........................ 83/880 |
| 5,195,410 A | * | 3/1993 | Young | ....................... 83/956 X |
| 5,512,808 A | * | 4/1996 | Clark, Jr. et al. | .......... 83/881 X |
| 5,820,006 A | * | 10/1998 | Turner | .......................... 225/96 |
| 6,021,574 A | * | 2/2000 | Murray, III | ............ 30/164.9 X |

FOREIGN PATENT DOCUMENTS

| | | |
|---|---|---|
| GB | 809 977 | 3/1959 |
| JP | 1-110234 | 7/1989 |
| JP | 07164400 | 6/1995 |
| JP | 8-225332 | 9/1996 |
| JP | 8-325026 | 12/1996 |
| JP | 9-25134 | 1/1997 |
| JP | 9-269773 | 10/1997 |
| JP | 9-278473 | 10/1997 |

* cited by examiner

Primary Examiner—Clark F. Dexter
(74) Attorney, Agent, or Firm—Fish & Richardson P.C.

(57) ABSTRACT

A scribe device comprises a body (10). A holder (20) is supported by the body (10) such that the holder (20) can slightly slide in a direction of a slide axis (Lb) which intersects a surface of a workpiece (100). Retaining portions (15, 21) spaced apart in a direction of the slide axis (Lb) are formed on the body (10) and the holder (20), respectively. A vibratory actuator (40) is sandwiched between the retainer portion of the body and the retainer portion of the holder. The holder (20) holds an abutment member (30). The holder is biased by a biasing member (23) such that said retaining portion of the holder is pressed against the vibratory actuator. The vibratory actuator renders the vibrations in the direction of the slide axis to the holder. The abutment member transmits the vibrations from the holder to the workpiece. That is, the abutment member (30) is subjected to a static force and a vibration energy and pressed against the workpiece (100). In that state, the abutment member (30) is relatively moved with respect to the workpiece (100) to thereby form a scribe line in the workpiece.

11 Claims, 13 Drawing Sheets

SCRIBE DEVICE

BACKGROUND OF THE INVENTION

This invention relates to a scribe process and a scribe device for forming a scribe line on a surface of a workpiece of a hard material such as a sheet glass, or the like.

In general, in case a workpiece such as a sheet glass or the like is caused to be fracture, a scribe line is preliminarily formed on the surface of the workpiece and the workpiece is caused to be fracture along this scribe line. A conventional scribe device used for forming such a scribe line is disclosed, for example, in Japanese Utility Model Unexamined Publication No. Hei 1-110234. Specifically, as shown in FIGS. 22A and 22B, the conventional scribe device comprises a disc-shaped cutter 90 (abutment member) with a sharpened peripheral edge, a holder 91 rotatably supporting the cutter 90, and a pressing/moving mechanism (not shown) for pressing the cutter 90 against a surface of a sheet glass 100 (workpiece) through the holder 91 and moving the cutter 90 along the surface of the sheet glass 100.

A scribe line 105 is formed by moving the cutter 90 pressed against the sheet glass 100 as described above. The scribe line 105 includes, as shown in FIG. 22A, an edge entry portion 105a, a rib mark 105b, and a vertical crack 105c. In order to facilitate a fracture of the sheet glass 100, it is necessary to form the vertical crack 105c deeply. For this purpose, it suffices that the force for pressing the cutter 90 against the sheet glass 100 is increased. However, if the cutter 90 is pressed against the sheet glass 100 with an increased pressing force, there is a possibility that the scribe line 105 including not only the vertical crack 105c but also a horizontal crack 106 extending leftwardly and rightwardly from the scribe line 105 tend to occur as shown in FIG. 22B, thus unfavorably resulting in a cut, a peel-off, or the like formed in the vicinity of the scribe line 105 due to the horizontal crack 106.

In contrast, if the force for pressing the cutter 90 against the sheet glass 100 is decreased, the horizontal crack 106 does not occur but a sufficiently large depth of the vertical crack 105c becomes unobtainable. This means that the intended favorable fracture of the sheet glass 100 is unobtainable.

SUMMARY OF THE INVENTION

It is an object of the present invention to provide a scribe device capable of forming a deep and beautiful scribe line.

The subject matter of the present invention resides in a scribe process for scribing a surface of a workpiece by applying vibrations to the workpiece while pressing an abutment member against the surface of the workpiece.

In a device for carrying our this process, a holder is supported by a body such that the holder can slightly slide in a direction of a slide axis which intersects a surface of a workpiece. Retainer portions spaced apart in the direction of the slide axis are each formed on the body and the holder, respectively. A vibratory actuator is sandwiched between the retainer portion of the body and the retainer portion of the holder. The holder holds an abutment member, The holder is biased by a biasing member such that the retainer portion of the holder is pressed against the vibratory actuator. The vibratory actuator renders vibrations in the direction of the slide axis to the holder. The abutment member transmits the vibrations from the holder to the workpiece. When the body or the workpiece is moved, either manually or by a moving mechanism, relative to each other in that state, a scribe line is formed.

In a modified device, the body is attached with an elastic arm and an abutment member is attached to a distal end portion of the elastic arm. Vibrations of a vibratory actuator are transmitted to the abutment member through the elastic arm.

DETAILED DESCRIPTION OF THE EMBODIMENTS

The first embodiment of the present invention will now be described with reference to FIGS. 1 to 11.

Figure 1:
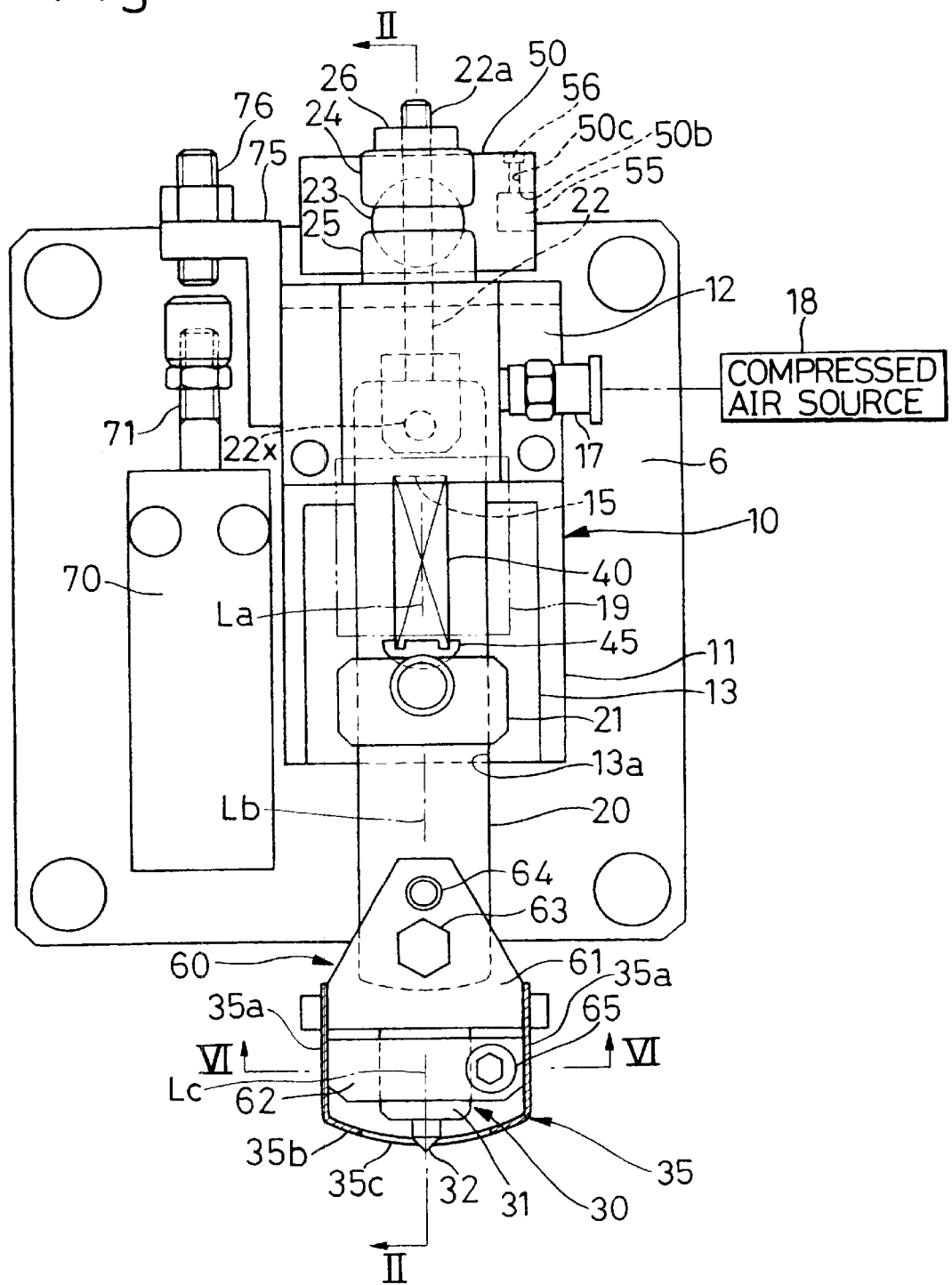
FIG. 1 is a front view of a scribe device according to the first embodiment of the present invention.
Figure 2:
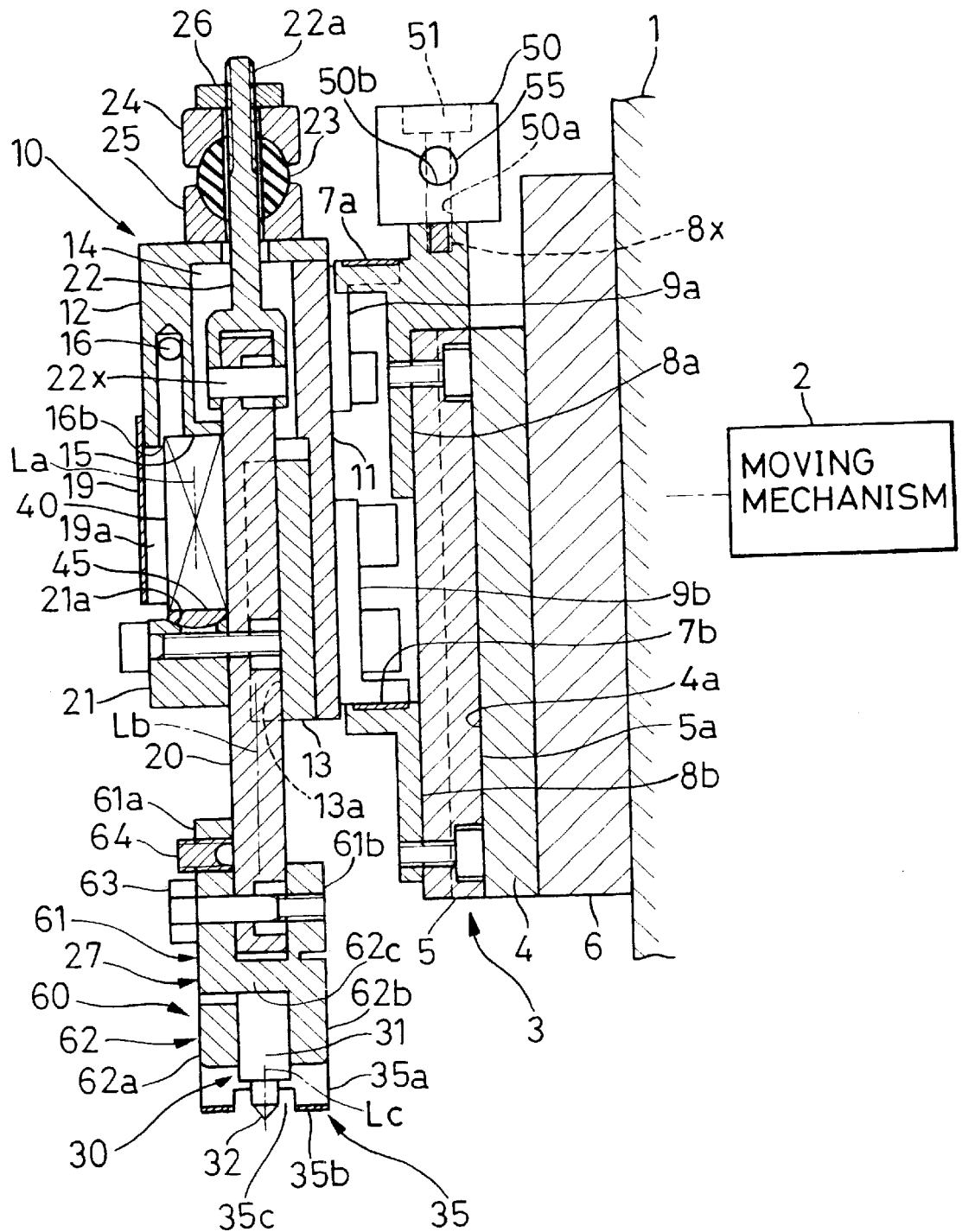
FIG. 2 is a vertical sectional view of the scribe device taken on line II—II of FIG. 1.

As shown in FIGS. 1 and 2, a scribe device comprises a movable table 1 (support table), a moving mechanism 2 for horizontally moving the movable table 1, a slide mechanism 3 disposed on the movable table 1, a body 10 vertically slidably supported by the slide mechanism 3, a holder 20 vertically slightly slidably supported by the body 10, a cutter 30 (that includes an abutment member 32) disposed on a lower end of the holder 20, and a piezo-actuator actuator 40 (vibratory actuator) for rendering vertical vibrations to the holder 20.

The above component elements will be described hereinafter in a sequential manner. The moving mechanism 2 moves the movable table 1 horizontally, i.e., in a left and right direction in FIG. 1 and in an orthogonal direction to the surface of paper in FIG. 2.

The slide mechanism 3 comprises a guide 4, and a slider 5. The guide 4 is fixed to the movable table 1 through a square attachment plate 6. The guide 4 has a guide groove 4a extending vertically. The vertically long slider 5 has a tongue 5a insertable into the guide groove 4a. Owing to this arrangement, the slider 5, is vertically slidably supported by the guide 4. The slider 5 is defined at its lowermost position by a stopper (not shown).

Figure 3:
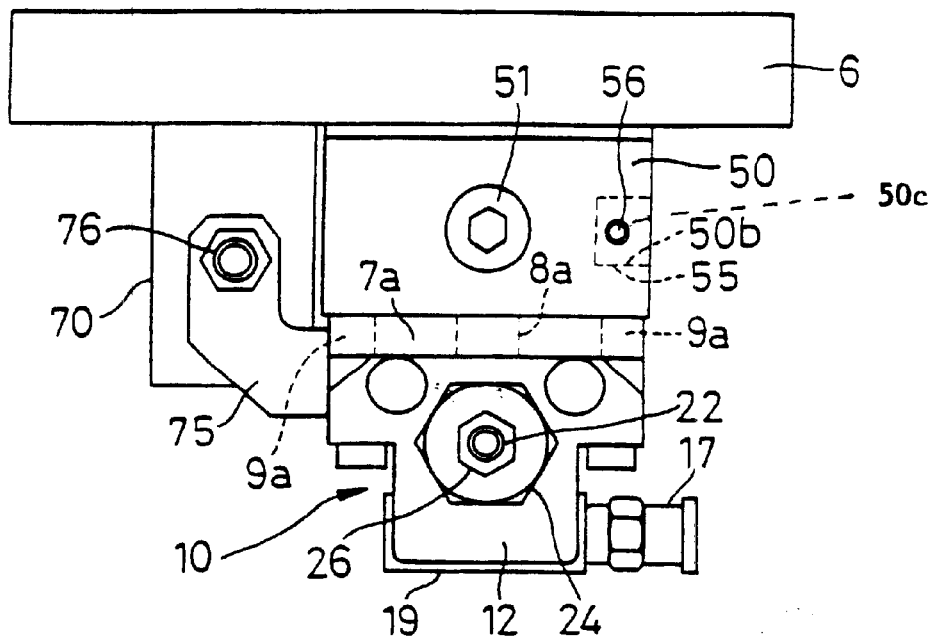
FIG. 3 is a plan view of the scribe device.

As shown in FIGS. 2 and 3, the body 10 is attached to the slider 5 through a pair of upper and lower horizontal plate springs 7a, 7b (vibration attenuating member having elasticity). Specifically, an upper and a lower bracket 8a, 8b are fixed to the slider 5. The plate springs 7a, 7b are fixed at their centers to the bracket 8a, 8b, respectively. On the other hand, a pair of upper and a pair of lower brackets 9a, 9b are fixed to the body 10, respectively. The pair of upper brackets 9a are disposed on opposite sides of and away from the upper bracket 8a and fixed to opposite ends of the plate spring 7a. Similarly, the pair of lower brackets 9b are also disposed on opposite sides of and away from the bracket 8b and fixed to opposite ends of the plate spring 7b.

Either one or both of the plate springs 7a, 7b may be fixed at their centers to the body 10 with opposite ends thereof fixed to the slider 5 side.

The upper bracket 8a projects upwardly and is detachably attached at its upper end face with a weight 50. That is, a vertical through-hole 50a is formed in the weight 50. A screw 51 is inserted into this through-hole 50a and screwed into a screw hole 8x formed in an upper end face of the bracket 8a. By doing so, the weight 50 can be attached to the upper bracket 8a.

The weight 50 is detachably attached with a cylindrical vibration sensor 55. That is, a receiving hole 50b is formed in a lateral surface of the weight 50, and the vibration sensor 55 is received in this receiving hole 50b. A vertical screw hole 50c is formed in the weight 50. A screw 56 (only shown in FIG. 3) is screwed into the screw hole 50c and presses at its distal end against an outer peripheral surface of the vibration sensor 55. By doing so, the vibration sensor 55 is fixed to the weight 50.

The body 10 has a vertically elongated square plate 11, a case member 12 fixed to a front surface of an upper portion of this plate 11, and a guide 13 fixed to a front surface of a lower portion of the plate 11. A receiving hole 14 is defined by the plate 11 and the case member 12. A retaining portion 15 comprised of a shallow recess for the piezo-actuator 40 is formed in a lower end of the case member 12.

The holder 20 exhibits a vertically extending planar configuration having a small width. An intermediate portion of this holder 20 is in engagement with a vertically extending guide groove 13a formed in the guide 13. Owing to this arrangement, the holder 20 is supported by the body 10 such that the holder 20 can slightly slide in a vertical direction. In this embodiment, a center axis or slide axis Lb of the holder 20 vertically extends in parallel relation to the slide axis. A retaining member 21 (retaining portion of the holder 20) is fixed to a front surface of a longitudinally intermediate portion of the holder 20. The piezo-actuator 40 is vertically elongated and exhibits a square configuration in section. An upper end of the piezo-actuator 40 is engaged with and retained by the retaining portion 15 of the body 10, while a lower end thereof is retained by the retaining member 21 of the holder 20. In other words, a center axis La of the piezo-actuator 40 vertically extends in parallel relation to the center axis Lb of the holder 20 and the piezo-actuator 40 is sandwiched between the retaining portion 15 and the retaining member 21. The piezo-actuator 40 is subjected to high frequency ac voltage and cyclically expanded and contracted in a vertical direction. This cyclical expansion and contraction causes the holder 20 to be vibrated in the vertical direction.

Fixed to a lower end of the piezo-actuator 40 is a support member 45 having a spherical lower surface. The lower surface of the support member 45 is in contact with a conical or spherical retaining surface 21a formed on the retaining member 21. Owing to this arrangement, the vibrations of the piezo-actuator 40 can be delivered uniformly in the direction of the center axis Lb of the holder 20, i.e., in the direction of the slide axis.

A vertically upwardly extending rod 22 is connected to an upper end of the holder 20 through a pin 22x.

The rod 22 pierces through an upper wall of the case member 12 of the body 10 and projects upwardly. A ball 23 (spherical biasing member) made of elastic material such as rubber, resin, or the like, and an upper and a lower retaining seat 24, 25 are arranged on the upper wall. The retaining seats 24, 25 have spherical surfaces and are located on an upper and a lower side of the ball 23, respectively, They are supported in the states pierced by the rod 22.

A male screw 22a is formed on an upper end portion of the rod 22. The upper retaining seat 24 is threadingly engaged with the male screw 22a. By tightening this retaining seat 24, the ball 23 is sandwiched between the retaining seats 24, 25 with the lower retaining seat 25 abutted with an upper surface of the case member 12, so that the ball 23 is elastically deformed. A restoring force of the ball 23 is served as a force for biasing the holder 20 upwardly with respect to the body 10, and therefore, as an elastic force normally applied to the piezo-actuator 40 through the retaining member 21 of the holder 20.

The male screw 22a is further threadingly engaged with a lock nut 26, so that the upper retaining seat 24 is prevented from getting loosened. The upper retaining seat 24 may merely be pierced by the rod 22 without being threadingly engaged with the rod 22. In that case, the ball 23 is elastically deformed by tightening the lock nut 26.

The holder 20 is biased upwardly by elasticity of the ball 23. Since this biasing force causes the retaining member 21 to press the piezo-actuator 40, the piezo-actuator 40 is stably supported by the body 10. The holder 20 can slide (movable) vertically within a range of elastic deformation of the ball 23. The above expression "can slightly slide" refers to this sliding movement.

Figure 4A:
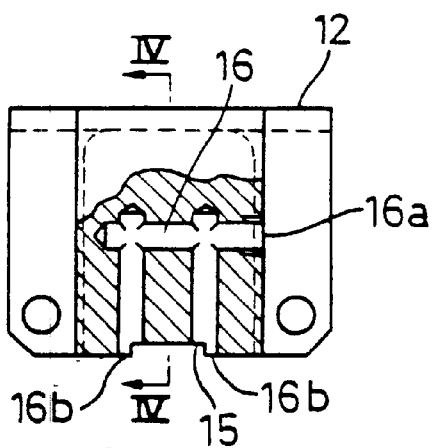
FIG. 4A is a front view, partly in section, of a case member of a body of the scribe device.
Figure 4B:
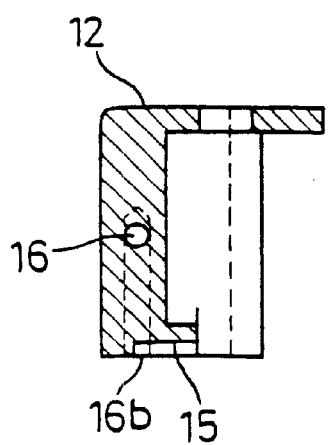
FIG. 4B is a sectional view taken on line IV—IV of FIG. 4A.
Figure 4C:
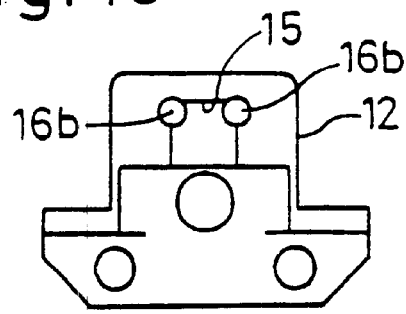
FIG. 4C is a bottom view.

A cooling structure for the piezo-actuator 40 will now be described in detail. As best shown in FIG. 4, an air passageway 16 is formed in the case member 12 of the body 10. One open end 16a of the air passageway 16 is located on a side surface of the case member 12. A compressed air source 18 (air pressure source) is connected to this open end 16a through a joint 17.

The air passageway 16 horizontally extends from the one open end 16a and is bifurcated and extends downwardly. The other open ends 16b are located on a lower surface of the case member 12. More specifically, the other open ends 16b are located on two corners of the retaining portion 15. An upper end of the piezo-actuator 40 partly blocks the two opening ends 16b. A cover 19 having a generally U-shape in cross-section for covering the front surface and two side surfaces of the piezo-actuator 40 is attached to an outer surface of a lower end portion of the case member 12. Between the cover 19 and the piezo-actuator 40, there is formed a gap 19a. An upper end of this gap 19a is in communication with the other open end 16b of the air passageway 16, while a lower end thereof is opened.

Figure 5A:
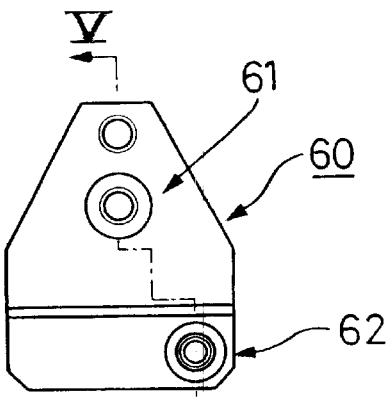
FIG. 5A is a front view of an attachment holding a cutter in the scribe device.
Figure 5B:
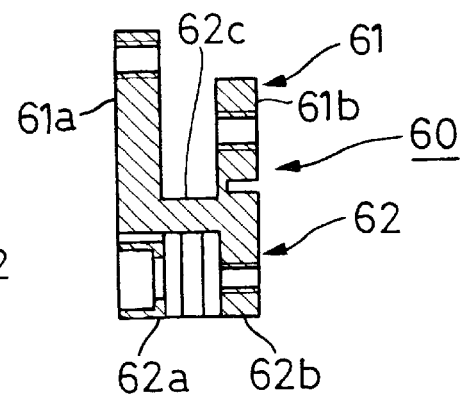
FIG. 5B is a sectional view taken on line V—V of FIG. 5A.
Figure 5C:
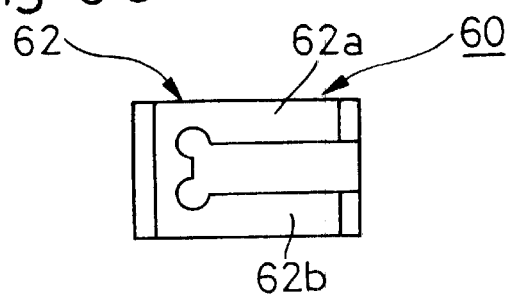
FIG. 5C is a bottom view of the attachment.

An attachment structure of the cutter 30 will now be described. The cutter 30 is attached to a lower end portion of the holder 20 through an attachment 60. As shown in FIG. 5, the attachment 60 has an upper attachment portion 61 and a lower grip portion 62.

The attachment portion 61 of the attachment 60 has two upstanding walls 61a, 61b and exhibits a U-shape in vertical section. As shown in FIG. 2, a lower end portion of the holder 20 enters between the upstanding walls 61a, 61b. A screw 63 is pierced through the upstanding wall 61a of the attachment portion 61 and the lower end portion of the holder 20 and is screwed into the other upstanding wall 61b, thereby the attachment 60 is connected to the lower end portion of the holder 20.

In a state where the screw 63 is untightened, the attachment 60 can pivot about the screw 63 with respect to the holder 20. When the screw 63 is tightened and a screw 64 is screwed into the upstanding wall 61 a to press the distal end thereof against the lower end portion of the holder 20, the attachment 60 is fixed to the holder 20. In this way, the attachment 60 can be adjusted in angle with respect to the center axis Lb (slide axis) of the holder 20.

Figure 6:
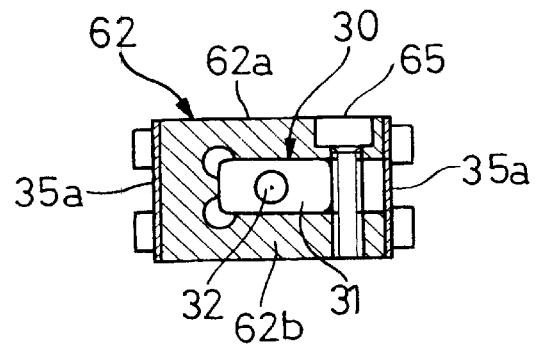
FIG. 6 is a cross-sectional view taken on line VI—VI of FIG. 1.

The grip portion 62 of the attachment 60 has two parallel pieces 62a, 62b and exhibits a U-shape in cross-section as shown in FIGS. 5 and 6. Between the pieces 62a, 62b, a sectionally square base portion 31 of the cutter 30 is received. In that state, a screw 65 is pierced through a distal end portion of the piece 62a of the grip portion 62 and screwed into a distal end portion of the other piece 62b so that the both pieces 62a, 62b are brought closer to each other. Then, by tightening the base portion 31 between the two pieces 62a, 62b, the cutter 30 is detachably fixed to the attachment 60.

The grip portion 62 has a horizontal lock wall 62c. In a state where the cutter 30 is fixed, the upper surface of the base portion 31 is in contact with the lock wall 62c.

The cutter 30 has the base portion 31, and a tip portion or abutment member 32 fixed to a center of the lower surface of the base portion 31. A center axis Lc of the tip portion 32 vertically extends in parallel relation to the center axis Lb of the holder 20. A lower end (forward end) of the tip portion is formed in a conical configuration and sharpened. The lower end of the tip portion or abutment member 32 may be formed in a pyramidal configuration. A pyramidal diamond grain is firmly secured to a lower end of the cutter 30. A top of this diamond grain faces just under so that it contacts a surface of a sheet glass 100 as later described.

A guide plate 35 (guide member) is attached to the attachment 60. This guide plate 35 is formed of a U-shaped plate spring. Opposite end portions of the guide plate 35 are terminated in flat fixture portions 35a, and a central portion of the guide plate 35 is formed in a convexly curved guide portion 35b. The pair of fixture portions 35a are fixed to opposite side surfaces of the lower grip portion 62 of the attachment 60.

Figure 7:
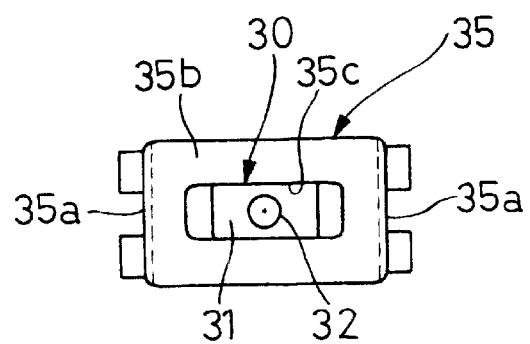
FIG. 7 is a bottom view of the cutter and a guide plate of the scribe device.

As shown in FIGS. 1 and 7, a hole 35c is formed in a central portion of the guide portion 35b. The tip portion 32 of the cutter 30 passes through this hole 35c and projects a predetermined amount (indicated by H of FIG. 8) downwardly from the guide portion 35b. In FIG. 8, the projected amount is illustrated in an exaggerated manner.

As shown in FIGS. 1 and 3, the attachment plate 6 is attached with an air-cylinder 70 (push-up mechanism) in a vertical manner. On the other hand, an L-shaped bracket 75 is fixed to a side surface of the case member 12 of the body 10. A vertical short rod 76 is threadingly engaged with the bracket 75. This short rod 76 and an upper end of the rod 71 of the air cylinder 70 are confronted with each other.

Figure 8A:
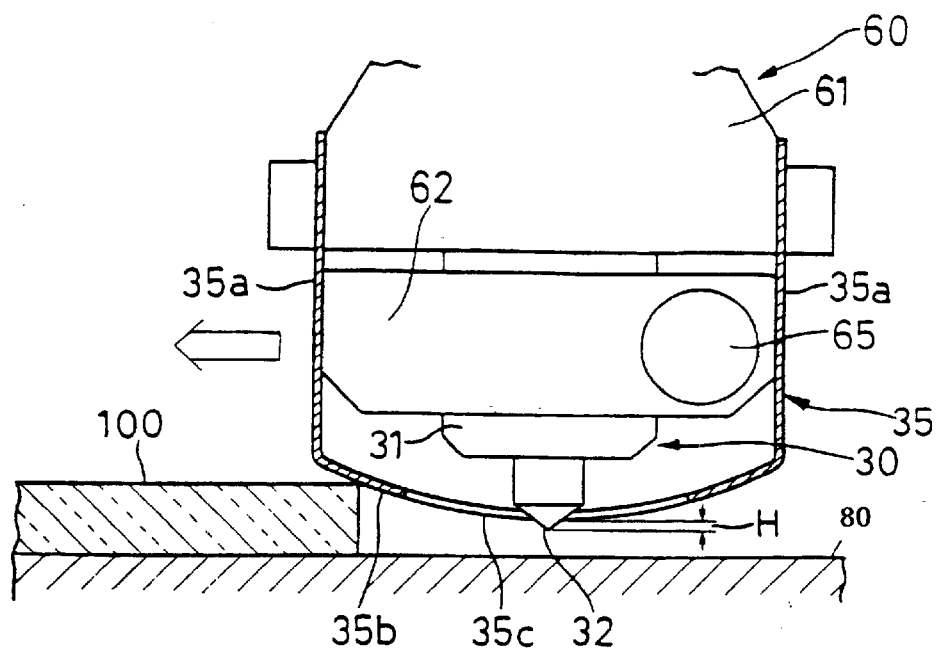
FIGS. 8A and 8B are enlarged sectional views sequentially showing the process for guiding the cutter to an end edge of a sheet glass.
Figure 8B:
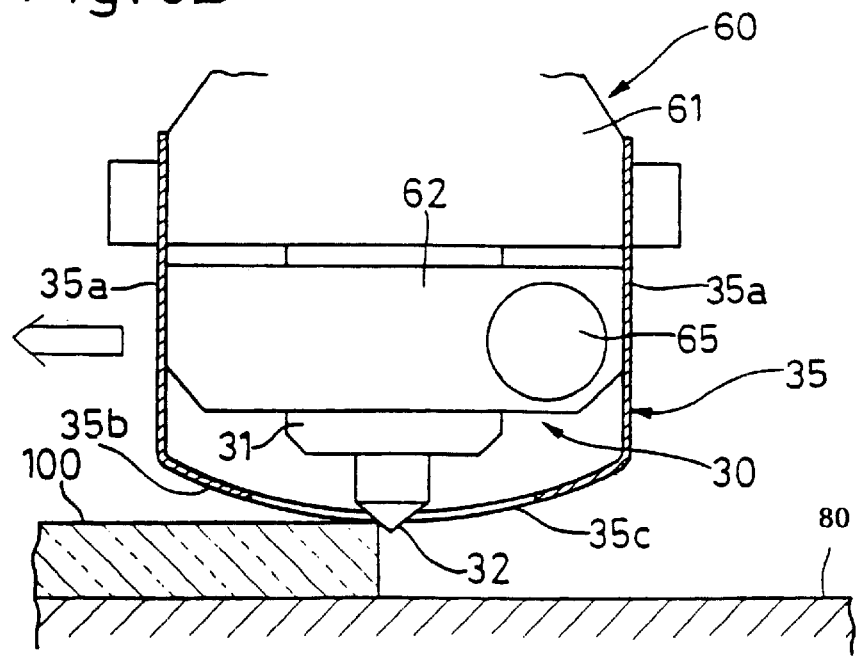
Figure 9:
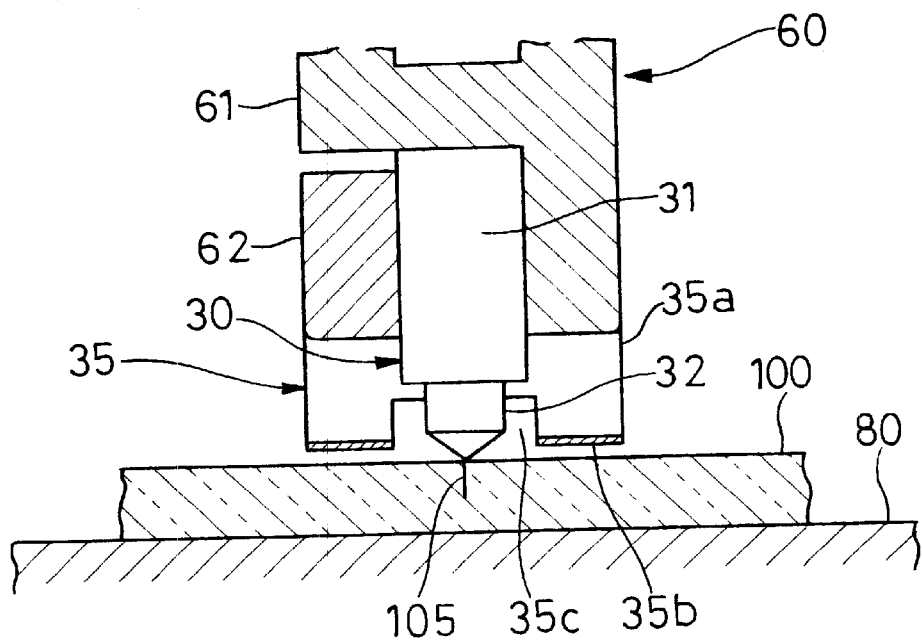
FIG. 9 is an enlarged sectional view showing the cutter, the guide plate and the sheet glass formed with a scribe line.

Operation of the scribe device thus constructed will now be described. As shown in FIG. 8, a sheet glass 100 (workpiece) is horizontally set in place on a horizontal installation table 80. In an initial state, the cutter 30 of the scribe device is horizontally away from the edge of the sheet glass 100 and located in the lowermost position (position corresponding to the lowermost position of the slider 5). In that state, when the moving mechanism 2 is driven to move the movable table 1 in the horizontal direction (direction as indicated by an arrow of FIG. 8), the body 10, the holder 20, and the cutter 30 are caused to move in unison in the same direction. Then, as shown in FIG. 8A, the curved guide portion 35b of the guide plate 35 attached to the holder 20 comes into contact with an end edge of the sheet glass 100. When the movable table 1 is further moved, the guide portion 35b is pushed up along the inclination of the guide portion 35b while being contacted with the end edge of the sheet glass 100, and thus, the slider 5, the body 10, the holder 20 and the cutter 30 are also pushed up. Before long, the cutter 30 arrives at the end edge of the sheet glass 100 as shown in FIG. 8B. By further slightly moving the table 1 in the direction as indicated by the arrow, the lower end of the tip portion 32 is placed on the upper surface of the sheet glass 100 through the taper of the tip portion 32 of the cutter 30.

As mentioned above, in the state where the cutter 30 is placed on the upper surface of the sheet glass 100 at an area in the vicinity of the end edge thereof, the cutter 30 is normally rendered a force for pressing the upper surface of the sheet glass 100. This pressing force is attributable to the dead weights of the body 10, the holder 20, the slider 5, the weight 50, etc.

Figure 10:
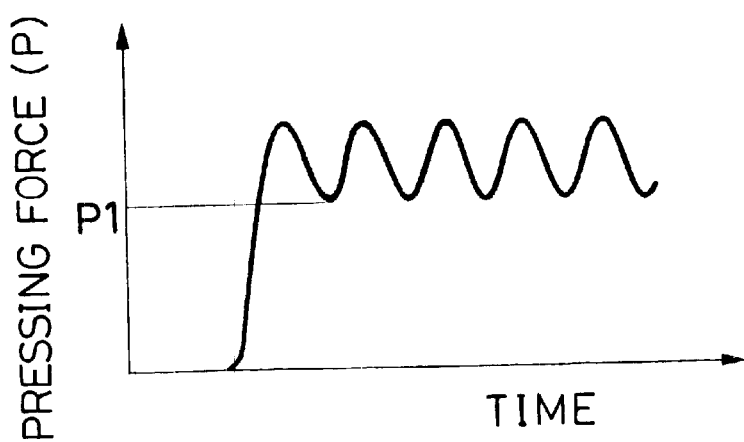
FIG. 10 is a graph showing a force for pressing the cutter against the sheet glass.
Figure 11:
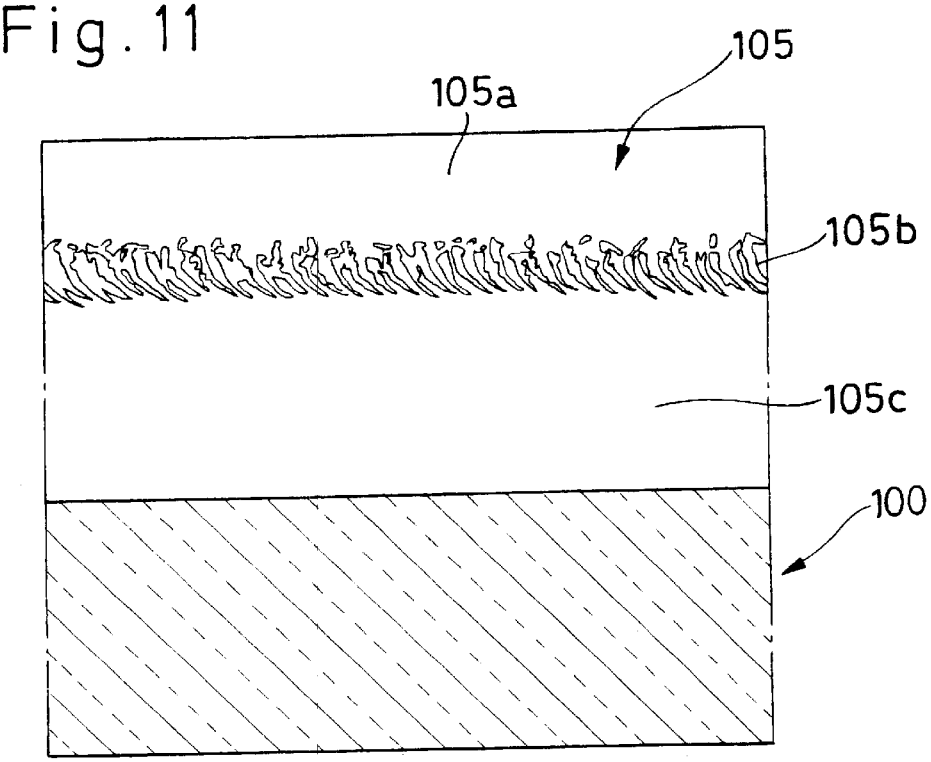
FIG. 11 is an enlarged sectional view taken along the scribe line formed on the sheet glass.

As mentioned above, the scribing is carried out in the state where the cutter 30 is pressed against the surface of the sheet glass 100 by the dead weights of the body 10, etc. That is, the moving mechanism 2 is driven to move the movable table 1 so that the cutter 30 is moved in the direction as indicated by the arrow of FIG. 8 (in the direction perpendicular to the surface of paper in FIG. 9). Then, a high frequency voltage is applied to the piezo-actuator 40, so that the piezo-actuator 40 is cyclically expanded and contracted. Then, the vibrations of the holder 20 caused by the cyclical expansion and contraction of the piezo-actuator 40 are transmitted to the sheet glass 100 through the cutter 30. In other words, as shown in FIG. 10, the pressing force P applied to the sheet glass 100 through the cutter 30 is obtained by adding a force due to vibrations of the piezo-actuator 40 to the static force P1 due to dead weights of the body 10, etc. Accordingly, the pressing force P cyclically becomes a very large force and applies a shock to the sheet glass 100 through the sharpened lower end of the cutter 30. As a result, a scribe line 105 having a deep vertical crack 105c can be formed in the sheet glass 100 as shown in FIG. 11. However, since the static force P1 is comparatively small, a horizontal crack, which occurs in the conventional device, hardly occurs.

Incidentally, the scribe line 105 formed by this embodiment has, unlike the prior art, a bear-like rib mark 105b as shown in FIG. 11.

The cycle of the pressing force P, in other words, the frequency of the high frequency voltage applied to the piezo-actuator 40 is set to about 3 to 30 KHz, and the expanding/contracting amount of the piezo-actuator 40, that is, the amplitude of the vibrations is set to about a few $\mu$m to 20 $\mu$m. depending on the hardness, thickness, etc. of the material of the sheet glass 100. The feed speed of the cutter 30 is preferably set to about 100 to 250 mm/sec in case the above frequency is employed.

In the forming process of the scribe line 105, since the cutter 30 is normally contacted with the surface of the sheet glass 100 by the pressing force caused by the dead weight of the body 10, etc. and never instantaneously separated from the surface of the sheet glass 100, a beautiful scribe line 105 can be formed by eliminating any damage occurrable to the area in the vicinity of the scribe line 105. Since the holder 20 is rigid and the cutter 30 is attached directly to the holder 20, the cutter 30 is vibrated in unison with the holder 20, and the vibration energy of the piezo-actuator 40 can be transmitted to the cutter 30 favorably. Moreover, a possibility of resonance can be reduced and a possibility of leap-up of the cutter 30 can be reduced.

Furthermore, in this embodiment, since the plate springs 7a, 7b are interposed between the body 10 and the slider 5 to attenuate vibrations, the possibility of resonance can be reduced more effectively.

Since the ball 23 is used as a biasing member, durability is good and an elastic force can positively be applied to the piezo-actuator 40.

In this embodiment, since the weight 50 is detachably attached to the slider 5, the static force P1 can be increased in accordance with necessity, that is, depending on material, hardness, thickness, etc. of the sheet glass 100. Moreover, by changing this weight 50, the static force P1 can be changed.

The dead weights of the slider 5 and the weight 50 are applied to the cutter 30 through the plate springs 7a, 7b. In other words, since the vibrations of the piezo-actuator 40 and a reaction received by the cutter 30 from the sheet glass 100 are attenuated by the plate springs 7a, 7b, the static force P1 caused by the slider 5 and the weight 50 can be stabilized.

The vibration sensor 55 attached to the weight 50 detects the vibrations transmitted to the slider 5 and sends them to a motor not shown. A vibration waveform is displayed in a monitor. The operator adjusts the frequency of the high frequency voltage to be applied to the piezo-actuator 40 so that the amplitude of the vibration waveform will not become extremely large due to resonance, and preferably, the amplitude will be minimized. By doing so, the possibility of resonance can more positively be eliminated.

Since the vibrations of the piezo-actuator 40 is transmitted to the vibration sensor 55 after being attenuated by the plate springs 7a, 7b, the vibration sensor 55 can positively detect an increased portion of the vibrations caused by resonance.

The vibration sensor 55 may be disposed on the body 10.

During the time the piezo-actuator 40 is driven, compressed air is supplied to the air passageway 16 of the body 10 from the compressed air source 19. By this, air is jetted towards the piezo-actuator 40 from the open end 16b of the air passageway 16. The air thus jetted passes through the gap 19a between the piezo actuator 40 and the cover 19 and is discharged from the lower end of the gap 19a. At that time, since the air flows along the front surface and both side surfaces of the piezo-actuator 40, it can cool the piezo-actuator 40. Accordingly, a failure due to excessive heating of the piezo-actuator 40 can be prevented.

When the formation of the scribe line 105 on the sheet glass 100 is completed by the cutter 30, the supply of an electric current to the piezo-actuator 40 is stopped and the air-cylinder 70 is driven to push up the body 10, thereby the cutter 30 is separated from the workpiece 100. Then, the sheet glass 100 is removed from the installation table 80. Thereafter, the movable table 1 is returned to its initial position and the air-cylinder 70 is driven in a reversed direction so that it is returned to a state of FIG. 1, i.e., a state where the upper end of the rod of the air-cylinder 50 is separated from the short rod 76. By doing so, the body 10 is returned to its lowermost position. Then, in the same manner as mentioned above, a new sheet glass 100 for the next operation is set to the installation table 80 and the scribe line forming procedure is carried out again.

Operation of the attachment 60 will now be described. As described previously, the attachment 60 can be adjusted in angle. In case the hardness of the sheet glass 100 is high, the center axis Lc of the tip portion 32 of the cutter 30 is brought into a vertical posture so as to be orthogonal to the surface of the sheet glass. 100. By doing so, a deep vertical crack can be formed. In case the hardness of the sheet glass 100 is low, the center axis Lc of the tip portion 32 is inclined towards the moving direction of the cutter 30 by adjusting the angle of the attachment 60. In other words, the center axis Lc is inclined towards the opposite side to the movement of the sheet glass 100 relative to the cutter 30. By doing so, a sinking amount of the tip portion 32 into the sheet glass 100 can be reduced so that it will not be caught by the sheet glass 100.

When the diamond grain of the tip portion 32 of the cutter 30 is worn out, the screw 65 is untightened to remove the cutter 30 from the attachment 60, so that the cutter 30 can easily be replaced by a new one.

Figure 12:
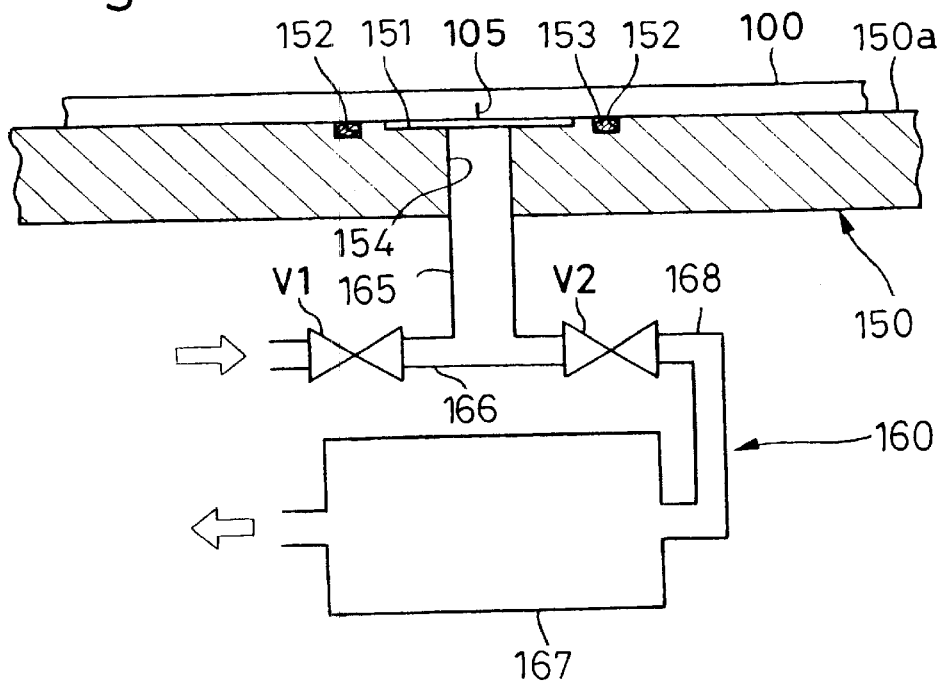
FIG. 12 is a schematic view showing a general construction of a device for fracturing the sheet glass formed with the scribe line.

For the purpose of reference, the sheet glass 100 formed with the scribe line 105 is fractured using a fracturing device of FIG. 12. This fracturing device is comprised of an installation table 150, and an evacuating device 160. A shallow recess 151 is formed in an upper surface 150a of the installation table 150. This recess 151 extends in a direction orthogonal to the surface of paper. The length of the recess 151 is set to be slightly shorter than an entire length of the scribe line 105.

A groove 152 is formed in an upper surface 1 50a of the installation table 150 in such a manner as to surround the recess 151. An O-ring 153 is fitted in this groove 152. An evacuating hole 154 communicating with the recess 151 is formed in the installation table 150. One end of a communicating tube 165 of the evacuating device 160 is connected to the evacuating hole 154. The other end of the communicating tube 165 is connected to an air opening tube 166 which is open to atmospheric air through a first solenoid valve V1, and a suction tube 168 communicating with a vacuum tank 167 through a second solenoid valve V2. The vacuum tank 167 is connected to a vacuum pump (not shown), so that a high degree of evacuation is normally maintained.

In case the sheet glass 100 is fractured using this fracturing device, the sheet glass 100 is placed on the upper surface 150a of the installation table 150 such that the sheet glass 100 may intimately contact the O-ring 153 on the surface 150a of the installation table 150. At that time, the scribe line 105 is directed downwardly and positioned in the widthwise center of the recess 151. Then, the first and second solenoid valves V1 and V2 are alternately repeatedly opened and closed at a short cycle, so that a shocking suction force is repeatedly acted on a lower surface of the sheet glass 100 already formed with the scribe line 105. By this, the sheet glass 100 can be fractured along the scribe line. As mentioned above, since the scribe line 105 is formed deeply and beautifully, the fracture can be carried out along the scribe line 105 easily and positively.

Other embodiments of the present invention will now be described. In those embodiments to be described hereinafter, those component parts corresponding to the first embodiment are denoted by the same reference numerals and detailed description thereof is omitted.

Figure 13:
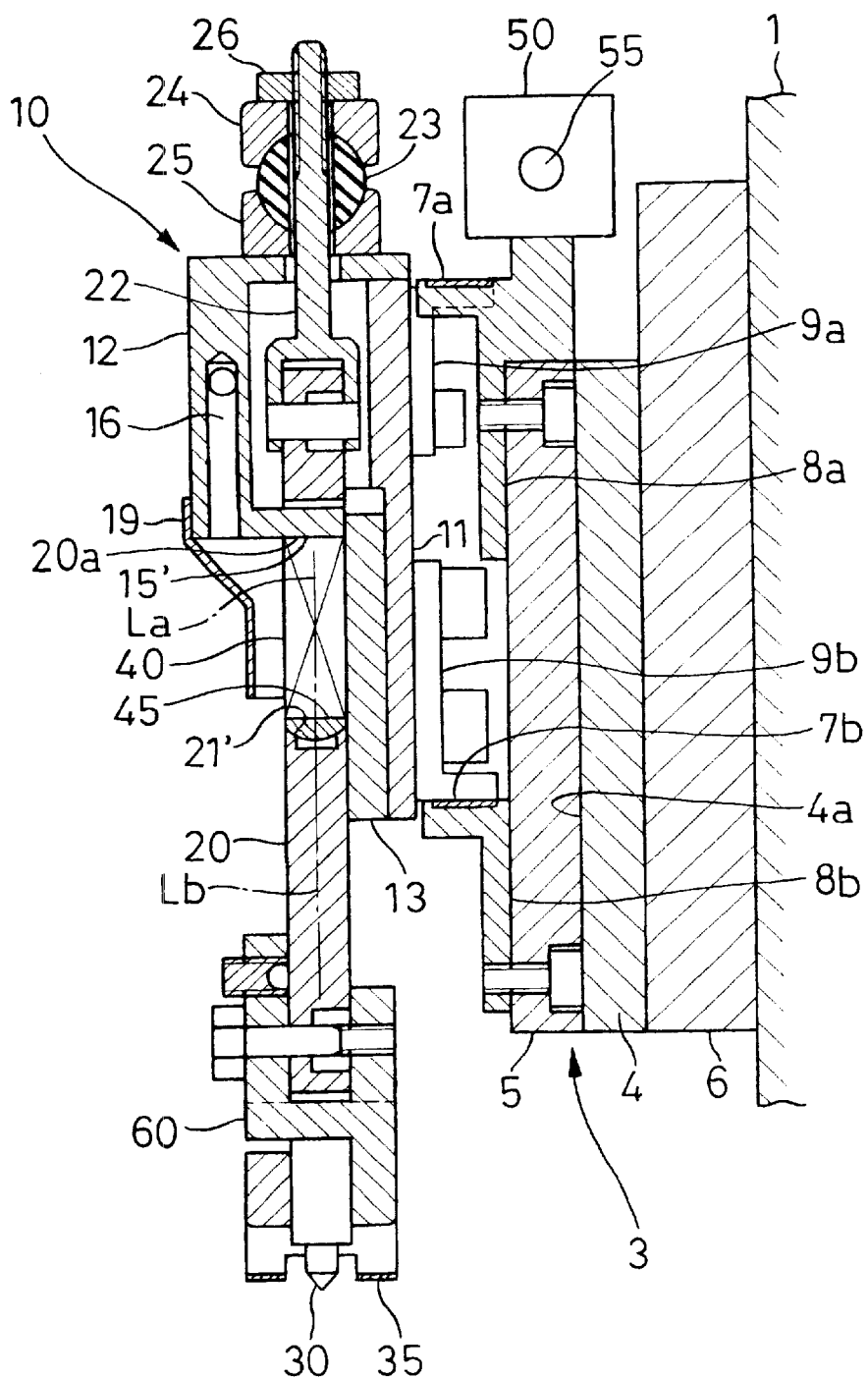
FIG. 13 is a vertical sectional view of a scribe device according to the second embodiment of the present invention.

FIG. 13 shows the second embodiment of the present invention. The largest difference of this second embodiment from the first embodiment resides in that the center axis La of the piezo-actuator 40 is coincident with the center axis Lb of the holder 20 and forms a linear line. Specifically, a through-hole 20a (receiving space) is formed in the holder 20 in its widthwise direction. This through-hole 20 exhibits an elongated square configuration extending in a longitudinal direction of the holder 20. The piezo-actuator 40 is received in this through-hole 20a.

A central portion of a lower edge of the through-hole 20a is served as a retainer portion 21'. This retaining portion 21' is formed in a conical surface or a spherical surface so that the support member 45 attached to the lower end of the piezo-actuator 40 can be retained efficiently. On the other hand, a tongue 15' is formed at the lower end of the case member 12 of the body 10. This tongue 15' is entered into an upper end portion of the through-hole 20a and serves as a retaining portion for retaining the upper end of the piezo-actuator 40.

In the second embodiment, since the center line La of the piezo-actuator 40 is in alignment with the center axis Lb of the holder 20, the vibrations of the piezo-actuator 40 can be transmitted to the holder efficiently.

Figure 14:
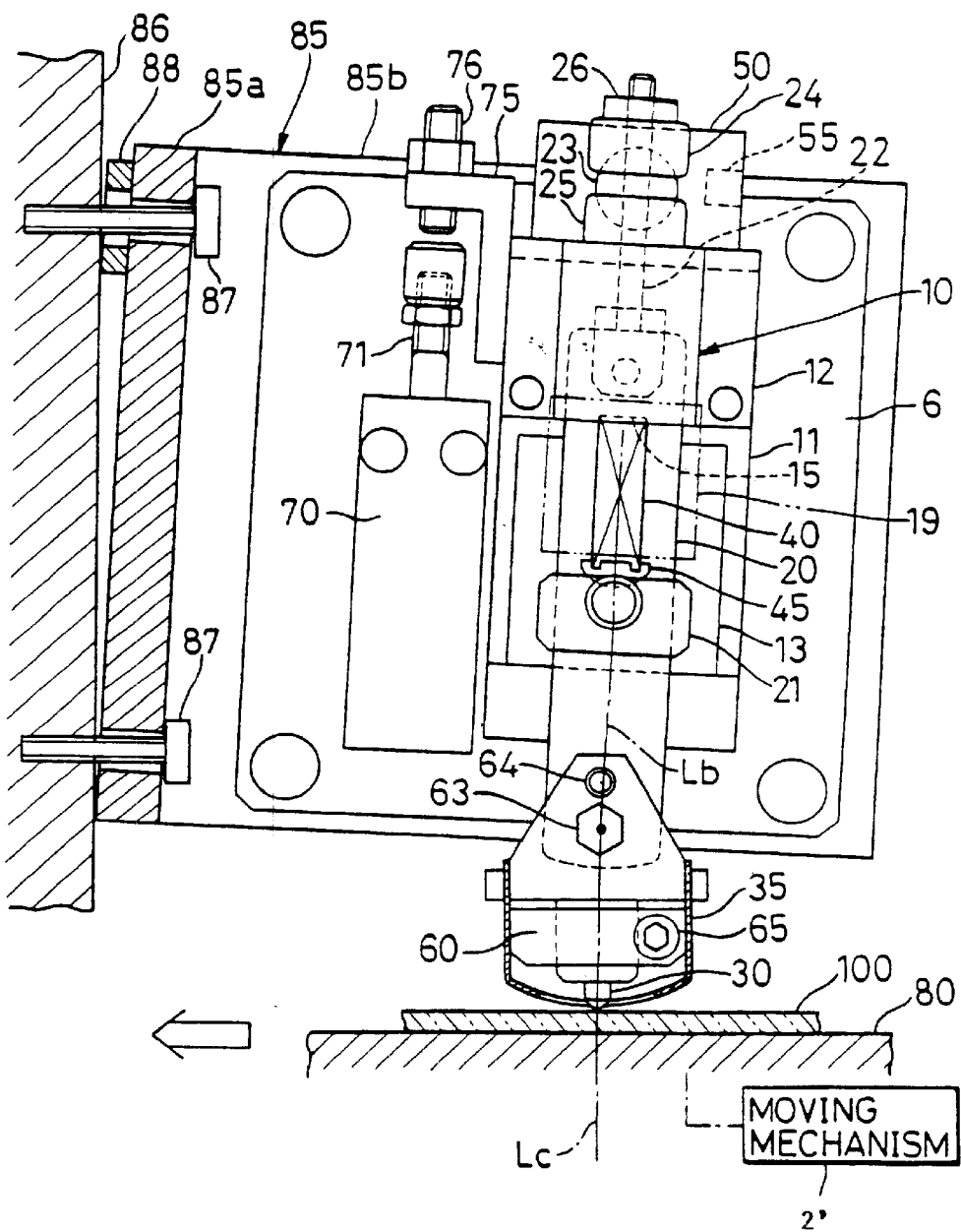
FIG. 14 is a front view, partly in section, of a scribe device according to the third embodiment of the present invention.

FIG. 14 shows the third embodiment of the present invention. In this embodiment, the attachment plate 6 is fixed to a support table 86 through a bracket 85. The bracket 85 exhibits an L-shaped configuration in plan view. A plate portion 85a of the bracket 85 is fixed to the support table 86 by two upper screws 87 and two lower screws 87. An attachment plate 6 is fixed to the other plate portion 85b. A washer 88 is interposed between the plate portion 85a and the support table 86. The plate portion 85a is inclined relative to a vertical plane by this washer 88. The upper screws 87 are pierced through this washer 88. The inclination of the bracket 85 is adjusted by the thickness of this washer 88. In FIG. 14, the inclination of the bracket 85 is illustrated in an exaggerated manner.

The inclination of the bracket 85 causes the inclination of the component elements disposed on the attachment plate 6, i.e., the guide 4 and the slider 5 of the slide mechanism 3, the body 10 and the holder 20. That is, the center axis Lb (the slider axis) of the holder 20, the slide axis of the slider 5 and the center axis La (the vibration axis) of the piezo-actuator 40 are inclined.

In the third embodiment, the installation table 80 is moved by the moving mechanism 2', thereby the sheet glass 100 is moved horizontally relative to the cutter 30. The center axis Lb (slide axis) of the holder 20 is inclined in the opposite direction to the relative movement direction of the sheet glass 100. That is, in case the sheet glass 100 horizontally proceeds leftwardly as shown in FIG. 14, the center axis Lb of the holder 20 is fallen rightwardly of a vertical axis (axis orthogonal to the moving direction of the sheet glass 100).

Figure 15:
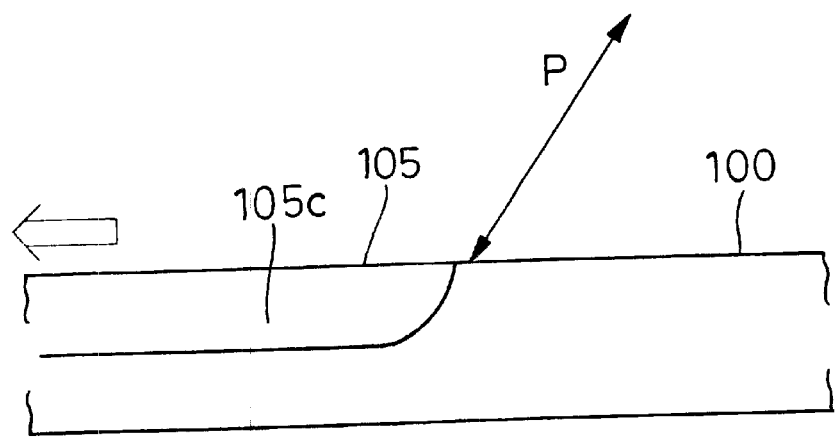
FIG. 15 is a schematic view showing a relation between a direction towards which a pressing force and a vibratory energy are rendered and a direction of movement of a workpiece in the third embodiment.

In the third embodiment, since the center axis Lb of the holder 20 is inclined, the pressing force P and the vibration energy from the cutter 30 to the sheet glass 100 are given from the inclined direction as shown in an exaggerated manner in FIG. 15. In other words, they are supplied towards the vertical crack 105c in such a manner as to grow the vertical crack 105c. Therefore, the deep vertical crack 105c can be formed more positively.

In the third embodiment, the inclination of the center axis Lc (center axis of the cone or pyramid) of the tip portion 32 of the cutter 30 with respect to the sheet glass 100 can be adjusted by adjusting the angle of the attachment 60. That is, in case the hardness of the sheet glass 100 is high, the center axis Lc of the tip portion 32 is brought into a correct or nearly correct right angle to the surface of the sheet glass 100 by reducing the angle of intersection between the center axis Lc of the tip portion 32 and the center axis Lb of the holder 20 as shown in FIG. 14. In case the hardness of the sheet glass 100 is low, the angle of intersection between the center axis Lc of the tip portion 32 and the center axis Lb of the holder 20 is increased, thereby the inclination of the center axis Lc of the tip portion 32 with respect to the sheet glass 100 is increased.

In the third embodiment, instead of inclining the bracket 86, the guide 4 (see FIG. 1) fitted to the attachment plate 6 may be inclined.

Figure 16:
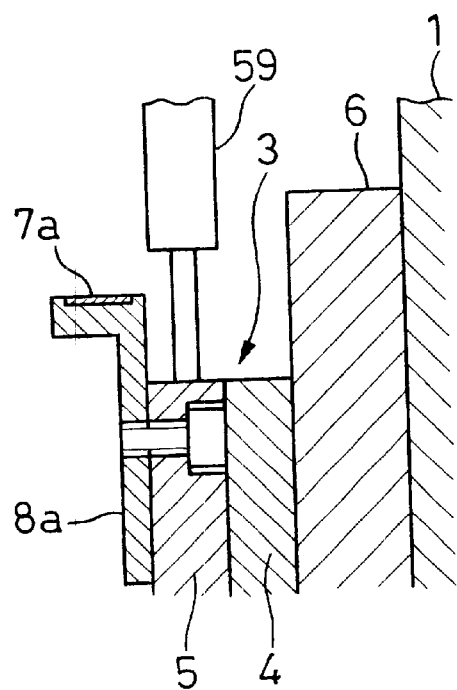
FIG. 16 is a sectional view of a main portion of a scribe device according to the fourth embodiment of the present invention.

FIG. 16 shows a main portion of the fourth embodiment. In this fourth embodiment, the air-cylinder 59 (biasing mechanism, pressing means) is fixed, either directly or through the attachment plate 6, to the support table 1, for example, and a distal end of the rod is connected to or abutted with the slider 5. By driving the air-cylinder 59, the slider 5 and the body 10 are biased towards the surface of the workpiece. Use of this air-cylinder 59 makes it possible to carry out the scribing operation with the holder 20 fallen in a horizontal posture and the workpiece held in a vertical posture.

In the first, second and fourth embodiment, it is also acceptable that the support table 1 for supporting the body 10 is fixed in place without being moved horizontally, the moving mechanism 2' is connected to the installation table 80, and the sheet glass 100 placed on the installation table 80 is moved. In the third embodiment, the support table 80 may be moved rightwardly in FIG. 14.

Instead of the ball 23, a plurality of coned disc springs superimposed one upon another, or the like may be used as the biasing member.

The body 10 may be fixed, directly and not through the plate springs 7a, 7b, to the slider 5. It is also an interesting alternative that the body 10 is integral with the slider 5.

A vacuum mechanism may be used as the air pressure source. In that case, the air flows in the opposite direction to the air-flow described in the above embodiments.

The movement of the body 10 relative to the workpiece or the movement of the workpiece relative to the body 10 may be manually carried out by the operator. Similarly, the pressing force to the cutter 30 may be manually applied by the operator through the body 10.

Figure 17:
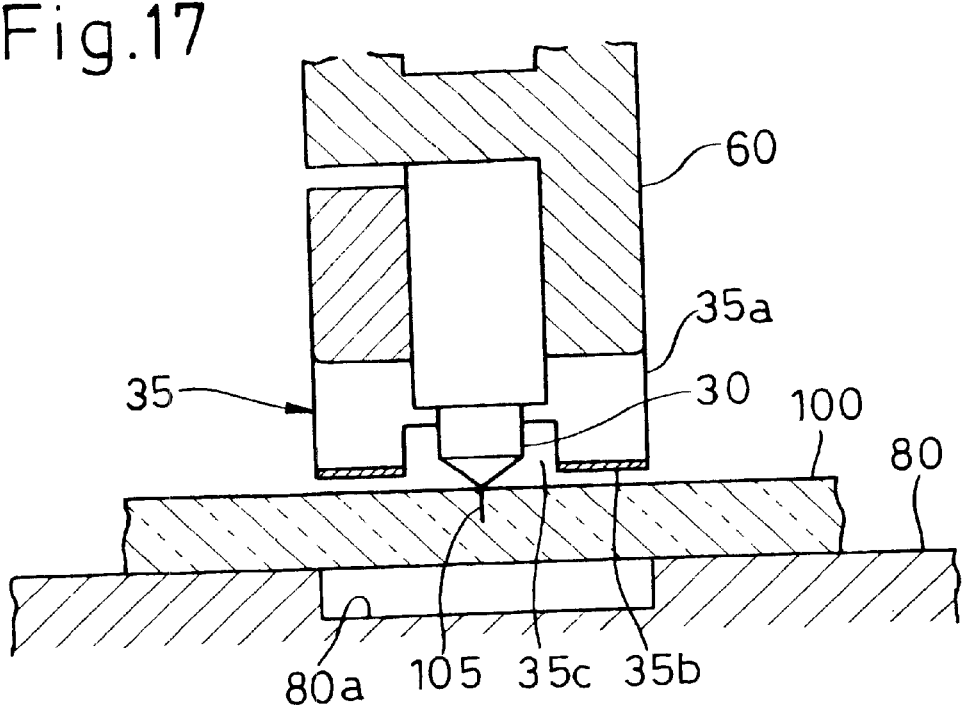
FIG. 17 is a view showing another mode of a process for forming a scribe line using the scribe device.

In the embodiment of FIG. 17, a recess 80a is formed in the installation table 80. The sheet glass 100 is placed on the installation table 80 such that an area of the sheet glass 100 to be formed with the scribe line is coincident with the recess 80a, and the scribing operation is performed in that state. By doing so, even if the flatness of the sheet glass 100 and he flatness of the installation table 80 are inferior, the vibration energy can be applied to the sheet glass 100 in a stable manner.

Figure 18:
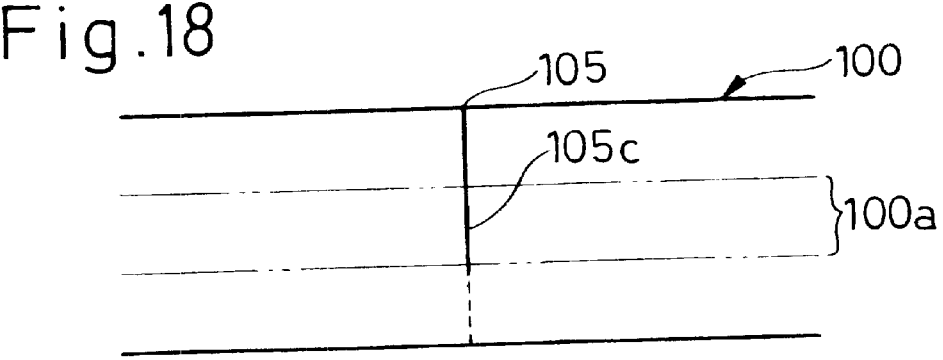
FIG. 18 is a view showing still another mode of a process for forming a scribe line using the scribe device.

As shown in FIG. 18, a compression layer 100a (layer where a compressive stress is present as an internal stress) is present in a thickness-wise central portion of the sheet glass 100. In case the sheet glass 100 is thin, a scribe line is preferably formed in such a manner that the vertical crack 105c transverses the compression layer 100a. By doing so, the vertical crack grows in a natural manner after the scribe line is formed, as indicated by the broken line. Therefore, the workpiece can be fractured without a need of the fracturing process discussed above.

Figure 19:
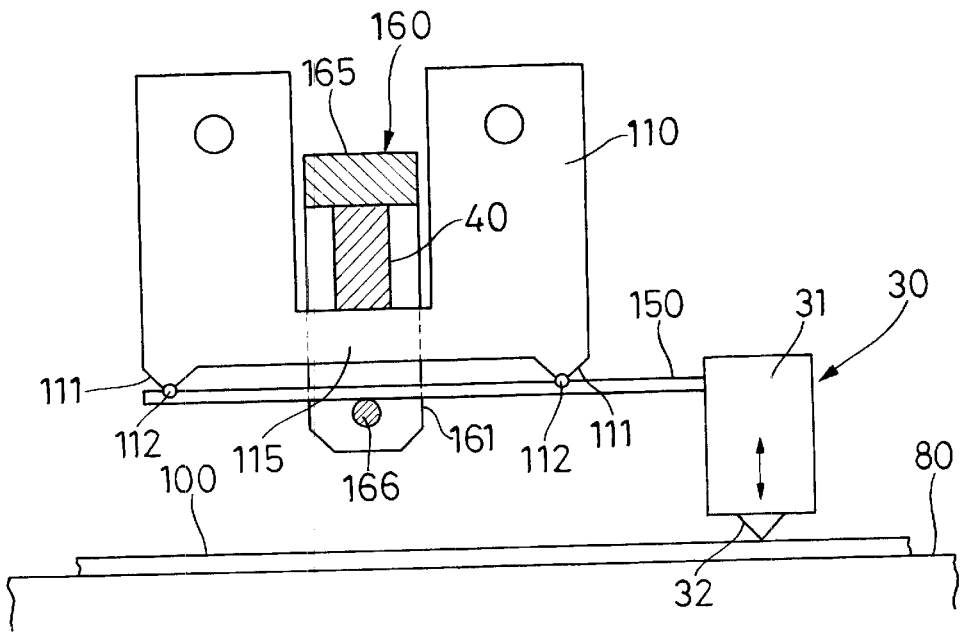
FIG. 19 is a schematic view of a scribe device according to the fifth embodiment of the present invention.

FIG. 19 shows a scribe device according to the fifth embodiment of the present invention. This scribe device includes a generally U-shaped body 110. The body 110 is fixed to a support frame, etc., not shown. Two projections 111 are formed on a lower end face of the body 110 in such a manner to be spaced apart from each other. Supported on those projections 111 are one end portion and an intermediate portion of an elastic arm 150 extending horizontally through a support axis 112. The base portion 31 of the cutter 30 is detachably attached to the other end portion (free end portion) of the elastic arm 150.

The scribe device further comprises a vibration transmitting member 160. This vibration transmitting member 160 exhibits an inverted U-shape and a central portion 115 of the body 110 is inserted between a pair of leg portions 161 thereof. The piezo-actuator 40 is sandwiched between a central portion 115 of the body 110 and an upper portion 165 of the vibration transmitting member 160 in such a manner as to be able to vibrate in a vertical direction.

A vibratory pin 166 is disposed between lower end portions of the leg portions 161 of the vibration transmitting member 160. This vibratory pin 166 is located between the two support axes 112 for supporting the elastic arm 150 such that it is normally in abutment relation with a lower surface of the elastic arm 150.

Vibrations of the piezo-actuator 40 are transmitted to the elastic arm 150 through the vibration transmitting member 160 and the vibratory pin 166. Owing to this arrangement, a portion of the elastic arm 150 disposed between two support axes 112 is elastically vertically deformed about the support axes 112, thereby the cutter 30 disposed on the end portion of the elastic arm 150 is vibrated vertically. It should be noted, however, that the cutter 30 is vibrated only when the cutter 30 is in a free position where the cutter 30 is not pressed against the sheet glass 100, and the cutter 30 is almost prevented from vibrating by the sheet glass 100 when it is pressed against the sheet glass 100. As a result, kinetic energy of the vibrations is transformed into a force for pressing the cutter 30 against the sheet glass 100, and the cutter 30 is pressed against the sheet glass 100 by the pressing force which varies cyclically.

The frame or the installation table 80 for supporting the sheet glass 100 is moved horizontally, and preferably in the extending direction of the elastic arm 150 by a moving mechanism (not shown). By doing so, the cutter 30 relatively moves with respect to the sheet glass 100.

In the scribe device thus constructed; since the elastic arm 150 is elastically deformed when it forms a scribed line, the cutter 30 is pressed against the sheet glass 100. That is, a static force is applied to the cutter 30.

Figure 20:
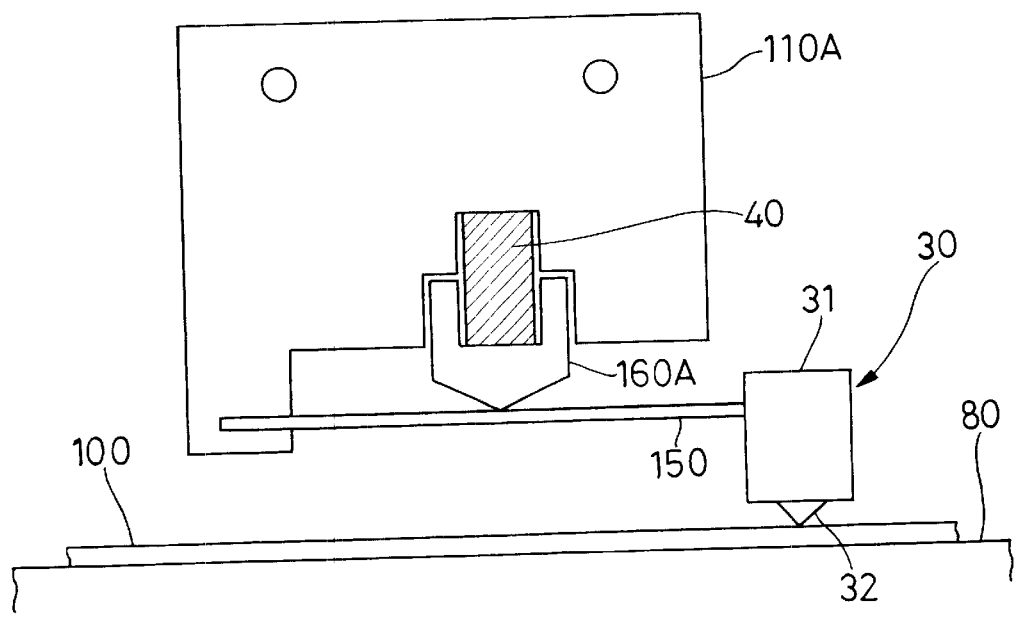
FIG. 20 is a schematic view of a scribe device according to the sixth embodiment of the present invention.

FIG. 20 shows the sixth embodiment of the present invention. One end portion of the elastic arm 150 is fixed to the body 110A, and the cutter 30 is attached to the other end portion of the elastic arm 150. An upper end portion of the piezo-actuator 40 is attached to the body 110 and a vibration transmitting member 160A is fixed to a lower end portion of the piezo-actuator 40. This vibration transmitting member 160A is abutted against an upper surface of an intermediate portion of the elastic arm 150.

Figure 21:
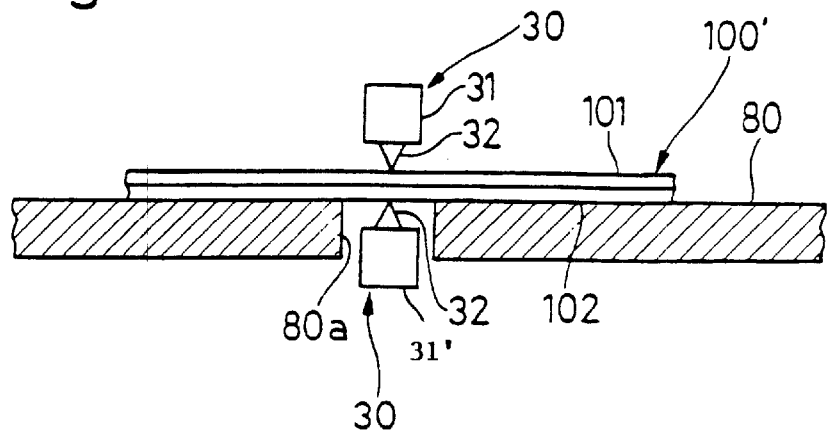
FIG. 21 is a schematic view showing: a process for forming a scribe line on each surface of a liquid crystal cell using two of the scribe devices of FIG. 19.

A process for forming a scribe line in upper and lower surfaces of a liquid crystal cell 100' (planar workpiece) comprised of two substrates 101, 102 will now be described with reference to FIG. 21. In that case, a pair of scribe devices shown in FIG. 16, 19 or 20 are employed, and the scribe lines are simultaneously formed by pressing the cutters 30 of the scribe devices against the upper and lower surfaces of the liquid crystal cell 100' while applying a vibration energy thereto. The installation table 80 is formed with a hole 80a for receiving therein the lower abutment member 30'. The installation table 80 is preferably provided with vacuum means for supporting the liquid crystal cell 100'. The liquid crystal cell 100' formed with the scribe line in its upper and lower surfaces can easily be fractured.

Figure 22A:
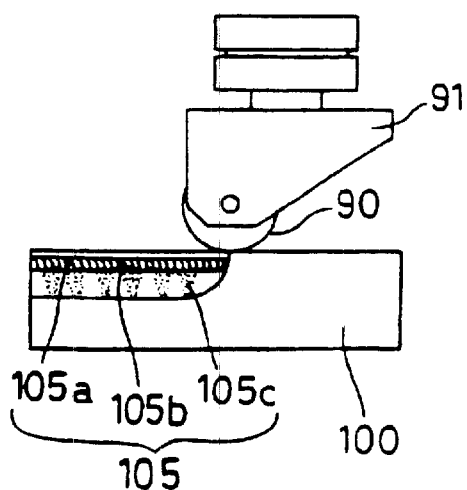
FIG. 22A is a front view, partly in section, of a scribe device according to the prior art.
Figure 22B:
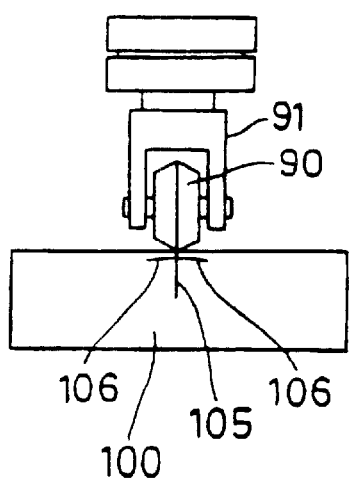
FIG. 22B is a side view of the scribe device.

In the above embodiments, the conical or pyramidal cutter 30 is employed. However, a disc-like cutter 90 as shown in FIGS. 22A and 22B may be employed. In that case, a part of a peripheral edge of the cutter 90 is provided as a sharpened forward end to be contacted with the workpiece.

The workpiece is not limited to the sheet glass. It may be a ceramic plate, a silicon wafer, or the like.

What is claimed is:

1. A scribe device comprising:
   (a) a body having a retaining portion;
   (b) a holder slidably supported by said body such that said holder can slightly slide in a direction of a slide axis (Lb) which extends in an upward and downward direction for sliding, toward and away from a surface of a workpiece, said holder having a retaining portion spaced a apart from said retaining portion of said body in the direction of said slide axis;
   (c) a vibratory actuator for rendering vibrations in the direction of said slide axis to said holder, said vibratory actuator being sandwiched between said retaining portion of said body and said retaining portion of said holder;
   (d) an abutment member held by said holder, said abutment member for transmitting the vibrations from said holder to said workpiece;
   (e) a biasing member mounted on said body and biasing said holder such that said retaining portion of said holder is pressed against said vibratory actuator; and
   (f) a slide mechanism having a guide and a slider, said slider being slidably supported by said guide such that said slider can slide in the direction of the slide axis (Lb), said body being disposed on said slider, thereby said abutment member being downwardly statically pressed against said surface of said workpiece by dead weights of said body, said holder, and said slider,
   wherein said slider and said body are connected together through a vibration attenuating elastic member.

2. A scribe device according to claim 1, wherein said vibration attenuating member comprises a plate spring.

3. A scribe device according to claim 2 wherein a vibration sensor is attached to said body or said slider.

4. A scribe device according to claim 2 further comprising a support member and a biasing mechanism, said guide of said slide mechanism and said biasing mechanism being supported by said support member, said biasing mechanism biasing said slider of said slide mechanism towards said surface of said workpiece so that said abutment member is pressed against said surface of said workpiece.

5. A scribe device according to claim 1 wherein a vibration sensor is attached to said body or said slider.

6. A scribe device according to claim 1 further comprising a weight wherein said slider is detachably attached to said weight.

7. A scribe device according to claim 6, wherein said weight is attached with a vibration sensor.

8. A scribe device according to claim 1 further comprising a support member and a push-up mechanism, said guide of said slide mechanism and said push-up mechanism being supported by said support member, said push-up mechanism pushing up said slider of said slide mechanism so that said abutment member is separated from said surface of said workpiece.

9. A scribe device according to claim 1 further comprising a support member and a biasing mechanism, said guide of said slide mechanism and said biasing mechanism being supported by said support member, said biasing mechanism biasing said slider of said slide mechanism towards said surface of said workpiece so that said abutment member is pressed against said surface of said workpiece.

10. A scribe device according to claim 1, wherein said abutment member is attached to one end of said holder, and a rod extending in a direction of said slide axis (Lb) is connected to the other end of said holder, said rod piercing through said body and projecting from said body, said biasing member being attached to the projected portion of said rod.

11. A scribe device according to claim 10, wherein said biasing member is comprised of a ball made of elastic material, and said ball (23) is sandwiched between one pair of retaining seats each having a spherical surface, said ball and said one pair of retaining seats are pierced therethrough by said rod.

\* \* \* \* \*